(12) United States Patent
Chan et al.

(10) Patent No.: US 9,128,895 B2
(45) Date of Patent: Sep. 8, 2015

(54) INTELLIGENT FLOOD CONTROL MANAGEMENT

(75) Inventors: Wilson Chan, San Mateo, CA (US); Angelo Pruscino, Los Altos, CA (US); Tak Fung Wang, Redwood City, CA (US); Cheng-Lu Hsu, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 12/389,306

(22) Filed: Feb. 19, 2009

(65) Prior Publication Data
US 2010/0211681 A1 Aug. 19, 2010

(51) Int. Cl.
*G06F 15/173* (2006.01)

(52) U.S. Cl.
CPC .................................. *G06F 15/173* (2013.01)

(58) Field of Classification Search
USPC ......... 709/226, 212, 213, 214, 215, 227, 229, 709/216
See application file for complete search history.

(56) References Cited

U.S. PATENT DOCUMENTS

| | | |
|---|---|---|
| 4,318,182 A | 3/1982 | Bachman et al. |
| 5,113,522 A | 5/1992 | Dinwiddie et al. |
| 5,222,217 A | 6/1993 | Blount et al. |
| 5,283,856 A | 2/1994 | Gross et al. |
| 5,347,632 A | 9/1994 | Filepp et al. |
| 5,357,612 A | 10/1994 | Alaiwan |
| 5,465,328 A | 11/1995 | Dievendorff et al. |
| 5,627,764 A | 5/1997 | Schutzman et al. |
| 5,649,102 A | 7/1997 | Yamauchi et al. |
| 5,721,825 A | 2/1998 | Lawson et al. |
| 5,754,841 A | 5/1998 | Carino, Jr. |
| 5,774,668 A | 6/1998 | Choquier et al. |
| 5,790,807 A | 8/1998 | Fishier et al. |
| 5,802,253 A | 9/1998 | Gross et al. |
| 5,828,835 A | 10/1998 | Isfeld et al. |
| 5,852,818 A | 12/1998 | Guay et al. |
| 5,862,325 A | 1/1999 | Reed et al. |
| 5,867,665 A | 2/1999 | Butman et al. |
| 5,867,667 A | 2/1999 | Butman et al. |
| 5,870,559 A | 2/1999 | Leshem et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge, Jr. et al. |
| 5,918,059 A | 6/1999 | Tavallaei et al. |
| 5,933,604 A | 8/1999 | Inakoshi |
| 5,940,839 A | 8/1999 | Chen et al. |

(Continued)

OTHER PUBLICATIONS

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

(Continued)

*Primary Examiner* — Lan-Dai T Truong
(74) *Attorney, Agent, or Firm* — Hickman Palermo Becker Bingham LLP

(57) ABSTRACT

Described herein are techniques for dynamically monitoring and managing resource usages of processes running on a node in a multi-node database system. High resource usages of processes can be proactively detected and alleviated, thereby making such a node to perform significantly better than otherwise.

20 Claims, 4 Drawing Sheets

(56) References Cited

U.S. PATENT DOCUMENTS

| | | |
|---|---|---|
| 5,951,694 A | 9/1999 | Choquier et al. |
| 5,970,439 A | 10/1999 | Levine et al. |
| 5,995,980 A | 11/1999 | Olson et al. |
| 5,999,931 A | 12/1999 | Breitbart et al. |
| 6,026,430 A | 2/2000 | Butman et al. |
| 6,029,205 A | 2/2000 | Alferness et al. |
| 6,035,379 A | 3/2000 | Raju et al. |
| 6,041,357 A | 3/2000 | Kunzelman et al. |
| 6,058,389 A | 5/2000 | Chandra et al. |
| 6,067,540 A | 5/2000 | Ozbutun et al. |
| 6,073,129 A | 6/2000 | Levine et al. |
| 6,088,728 A | 7/2000 | Bellemore et al. |
| 6,178,529 B1 | 1/2001 | Short et al. |
| 6,182,086 B1 | 1/2001 | Lomet et al. |
| 6,185,555 B1 | 2/2001 | Sprenger et al. |
| 6,188,699 B1 | 2/2001 | Lang et al. |
| 6,192,378 B1 | 2/2001 | Abrams et al. |
| 6,222,840 B1 | 4/2001 | Walker et al. |
| 6,243,751 B1 | 6/2001 | Chatterjee et al. |
| 6,247,017 B1 | 6/2001 | Martin |
| 6,304,882 B1 | 10/2001 | Strellis et al. |
| 6,327,622 B1 | 12/2001 | Jindal et al. |
| 6,334,114 B1 | 12/2001 | Jacobs et al. |
| 6,338,074 B1 | 1/2002 | Poindexter et al. |
| 6,393,423 B1 | 5/2002 | Goedken |
| 6,427,146 B1 | 7/2002 | Chu |
| 6,442,568 B1 | 8/2002 | Velasco et al. |
| 6,466,950 B1 | 10/2002 | Ono |
| 6,473,794 B1 | 10/2002 | Guheen et al. |
| 6,490,574 B1 | 12/2002 | Bennett et al. |
| 6,493,826 B1 | 12/2002 | Schofield et al. |
| 6,515,968 B1 | 2/2003 | Combar et al. |
| 6,519,571 B1 | 2/2003 | Guheen et al. |
| 6,529,932 B1 | 3/2003 | Dadiomov et al. |
| 6,536,037 B1 | 3/2003 | Guheen et al. |
| 6,539,381 B1 | 3/2003 | Prasad et al. |
| 6,549,922 B1 | 4/2003 | Srivastava et al. |
| 6,556,659 B1 | 4/2003 | Bowman-Amuah |
| 6,560,592 B1 | 5/2003 | Reid et al. |
| 6,587,866 B1 | 7/2003 | Modi et al. |
| 6,601,083 B1 * | 7/2003 | Reznak .......................... 718/104 |
| 6,601,101 B1 | 7/2003 | Lee et al. |
| 6,621,083 B2 * | 9/2003 | Cole .......................... 250/338.1 |
| 6,647,514 B1 * | 11/2003 | Umberger et al. .............. 714/42 |
| 6,651,012 B1 | 11/2003 | Bechhoefer |
| 6,654,907 B2 | 11/2003 | Stanfill et al. |
| 6,658,596 B1 | 12/2003 | Owen |
| 6,691,155 B2 | 2/2004 | Gottfried |
| 6,697,791 B2 | 2/2004 | Hellerstein et al. |
| 6,704,831 B1 | 3/2004 | Avery |
| 6,704,886 B1 | 3/2004 | Gill et al. |
| 6,728,748 B1 | 4/2004 | Mangipudi et al. |
| 6,757,710 B2 | 6/2004 | Reed |
| 6,769,074 B2 | 7/2004 | Vaitzblit |
| 6,793,625 B2 | 9/2004 | Cavallaro et al. |
| 6,802,003 B1 | 10/2004 | Gross et al. |
| 6,816,907 B1 | 11/2004 | Mei et al. |
| 6,826,182 B1 | 11/2004 | Parthasarathy |
| 6,826,579 B1 | 11/2004 | Leymann et al. |
| 6,850,893 B2 | 2/2005 | Lipkin et al. |
| 6,868,413 B1 | 3/2005 | Grindrod et al. |
| 6,882,994 B2 | 4/2005 | Yoshimura et al. |
| 6,889,231 B1 | 5/2005 | Souder et al. |
| 6,917,946 B2 | 7/2005 | Corl, Jr. et al. |
| 6,925,476 B1 | 8/2005 | Multer et al. |
| 6,980,988 B1 | 12/2005 | Demers et al. |
| 7,003,531 B2 | 2/2006 | Holenstein et al. |
| 7,031,974 B1 | 4/2006 | Subramaniam |
| 7,058,622 B1 * | 6/2006 | Tedesco .......................... 1/1 |
| 7,058,957 B1 | 6/2006 | Nguyen |
| 7,065,537 B2 | 6/2006 | Cha et al. |
| 7,080,382 B2 | 7/2006 | Sexton et al. |
| 7,089,228 B2 | 8/2006 | Arnold et al. |
| 7,095,871 B2 | 8/2006 | Jones et al. |
| 7,149,738 B2 | 12/2006 | Kumar et al. |
| 7,165,252 B1 * | 1/2007 | Xu .......................... 718/102 |
| 7,174,379 B2 | 2/2007 | Agarwal et al. |
| 7,177,866 B2 | 2/2007 | Holenstein et al. |
| 7,178,050 B2 | 2/2007 | Fung et al. |
| 7,243,256 B2 | 7/2007 | Kaiya et al. |
| 7,263,590 B1 | 8/2007 | Todd et al. |
| 7,269,157 B2 | 9/2007 | Klinker et al. |
| 7,359,910 B2 | 4/2008 | Wu et al. |
| 7,424,396 B2 | 9/2008 | Dodeja et al. |
| 7,506,215 B1 | 3/2009 | Maw et al. |
| 7,590,746 B2 * | 9/2009 | Slater et al. .................... 709/229 |
| 7,617,257 B2 | 11/2009 | Sathyanarayan et al. |
| 7,627,618 B2 * | 12/2009 | Honigfort .............. 1/1 |
| 8,117,505 B2 | 2/2012 | Sridharan et al. |
| 8,321,478 B2 | 11/2012 | Fong |
| 8,555,274 B1 * | 10/2013 | Chawla et al. .................... 718/1 |
| 2001/0032137 A1 | 10/2001 | Bennett et al. |
| 2001/0047270 A1 | 11/2001 | Gusick et al. |
| 2001/0052137 A1 | 12/2001 | Klein |
| 2001/0056493 A1 | 12/2001 | Mineo |
| 2002/0049845 A1 | 4/2002 | Sreenivasan et al. |
| 2002/0052885 A1 | 5/2002 | Levy |
| 2002/0073019 A1 | 6/2002 | Deaton |
| 2002/0073139 A1 | 6/2002 | Hawkins et al. |
| 2002/0091685 A1 | 7/2002 | Feldman et al. |
| 2002/0112008 A1 | 8/2002 | Christenson et al. |
| 2002/0116457 A1 | 8/2002 | Eshleman et al. |
| 2002/0129157 A1 | 9/2002 | Varsano |
| 2002/0133507 A1 | 9/2002 | Holenstein et al. |
| 2002/0138582 A1 | 9/2002 | Chandra et al. |
| 2002/0144010 A1 | 10/2002 | Younis et al. |
| 2002/0152305 A1 * | 10/2002 | Jackson et al. ................ 709/224 |
| 2002/0161896 A1 | 10/2002 | Wen et al. |
| 2002/0194015 A1 | 12/2002 | Gordon et al. |
| 2002/0194081 A1 | 12/2002 | Perkowski |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0037029 A1 | 2/2003 | Holenstein et al. |
| 2003/0037146 A1 | 2/2003 | O'Neill |
| 2003/0039212 A1 | 2/2003 | Lloyd et al. |
| 2003/0046421 A1 | 3/2003 | Horvitz et al. |
| 2003/0061260 A1 * | 3/2003 | Rajkumar .................... 709/104 |
| 2003/0088671 A1 | 5/2003 | Klinker et al. |
| 2003/0108052 A1 | 6/2003 | Inoue et al. |
| 2003/0110085 A1 | 6/2003 | Murren et al. |
| 2003/0135523 A1 | 7/2003 | Brodersen et al. |
| 2003/0135609 A1 | 7/2003 | Carlson et al. |
| 2003/0161468 A1 | 8/2003 | Iwagaki et al. |
| 2003/0177187 A1 | 9/2003 | Levine et al. |
| 2003/0208523 A1 | 11/2003 | Gopalan et al. |
| 2003/0212657 A1 | 11/2003 | Kaluskar et al. |
| 2003/0212670 A1 | 11/2003 | Yalamanchi et al. |
| 2003/0229804 A1 | 12/2003 | Srivastava et al. |
| 2003/0236834 A1 | 12/2003 | Gottfried |
| 2004/0024771 A1 | 2/2004 | Jain et al. |
| 2004/0024774 A1 | 2/2004 | Jain et al. |
| 2004/0024794 A1 | 2/2004 | Jain et al. |
| 2004/0024979 A1 | 2/2004 | Kaminsky et al. |
| 2004/0034640 A1 | 2/2004 | Jain et al. |
| 2004/0034664 A1 | 2/2004 | Jain et al. |
| 2004/0064548 A1 | 4/2004 | Adams et al. |
| 2004/0093512 A1 * | 5/2004 | Sample .......................... 713/201 |
| 2004/0103195 A1 | 5/2004 | Chalasani et al. |
| 2004/0107125 A1 | 6/2004 | Guheen et al. |
| 2004/0111506 A1 | 6/2004 | Kundu et al. |
| 2004/0117794 A1 | 6/2004 | Kundu |
| 2004/0133591 A1 | 7/2004 | Holenstein et al. |
| 2004/0172385 A1 * | 9/2004 | Dayal .......................... 707/3 |
| 2004/0176996 A1 | 9/2004 | Powers et al. |
| 2004/0181476 A1 | 9/2004 | Smith et al. |
| 2004/0215858 A1 * | 10/2004 | Armstrong et al. ........... 710/200 |
| 2004/0236860 A1 * | 11/2004 | Logston et al. .............. 709/230 |
| 2004/0268357 A1 | 12/2004 | Joy et al. |
| 2005/0010545 A1 | 1/2005 | Joseph |
| 2005/0021567 A1 | 1/2005 | Holenstein et al. |
| 2005/0021771 A1 | 1/2005 | Kaehn et al. |
| 2005/0033809 A1 | 2/2005 | McCarthy et al. |
| 2005/0125371 A1 | 6/2005 | Bhide et al. |

(56) References Cited

U.S. PATENT DOCUMENTS

| | | |
|---|---|---|
| 2005/0131875 A1 | 6/2005 | Riccardi et al. |
| 2005/0165925 A1 | 7/2005 | Dan et al. |
| 2005/0183072 A1 | 8/2005 | Horning et al. |
| 2005/0193024 A1 | 9/2005 | Beyer et al. |
| 2005/0228828 A1 | 10/2005 | Chandrasekar et al. |
| 2005/0239476 A1 | 10/2005 | Betrabet et al. |
| 2005/0240649 A1* | 10/2005 | Elkington et al. ............ 709/200 |
| 2005/0262205 A1 | 11/2005 | Nikoloy et al. |
| 2005/0267965 A1 | 12/2005 | Heller |
| 2005/0289175 A1 | 12/2005 | Krishnaprasad et al. |
| 2006/0036617 A1 | 2/2006 | Bastawala et al. |
| 2006/0112135 A1* | 5/2006 | Warshawsky ................. 707/102 |
| 2007/0100793 A1* | 5/2007 | Brown et al. ..................... 707/2 |
| 2007/0162260 A1 | 7/2007 | Nordstrom |
| 2007/0226323 A1 | 9/2007 | Halpern |
| 2008/0147614 A1 | 6/2008 | Tam et al. |
| 2008/0155641 A1* | 6/2008 | Beavin et al. ..................... 726/1 |
| 2008/0201383 A1* | 8/2008 | Honigfort ..................... 707/200 |
| 2008/0215878 A1 | 9/2008 | Gemmo |
| 2009/0112809 A1 | 4/2009 | Wolff et al. |
| 2009/0157722 A1 | 6/2009 | Liu et al. |
| 2009/0239480 A1* | 9/2009 | Rofougaran et al. ............ 455/73 |
| 2010/0082300 A1* | 4/2010 | Hollingsworth et al. ..... 702/186 |
| 2010/0145929 A1* | 6/2010 | Burger et al. ................. 707/713 |
| 2012/0072780 A1 | 3/2012 | Kini et al. |
| 2012/0143919 A1 | 6/2012 | Idicula |
| 2012/0221732 A1* | 8/2012 | Waldspurger ................. 709/226 |
| 2012/0271594 A1 | 10/2012 | Yan et al. |

OTHER PUBLICATIONS

Ying-Dar Lin et al.,—Direct Web Switch Routing with State Migration, TCP Masquerade, and Cookie Name Rewriting, Globecom 2003, IEEE Global Telecommunications Conference, Dec. 1, 2003, IEEE, CPO 10677300, pp. 3663-3667.

Chase, Jeffrey S., et al., "Dynamic Virtual Clusters in a Grid Site Manager," Proceedings of the 12th IEEE International Symposium on High Performance Distributed Computing, 2003, XP-010643715, 12 pgs.

Shiva, S.G., et al., "Modular Description/Simulation/Synthesis Using DDL," 19th Design Automation Conference 1982, IEEE Press, pp. 321-329.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

Spiegler, Israel, "Automating Database Construction," ACM SIGMIS Database, vol. 14, Issue 3, Spring 1983, pp. 21-29.

Kei Kurakawa et al., "Life Cycle Design Support Based on Environmental Information Sharing," IEEE, Feb. 1-3, 1999, Proceedings EcoDesign '99, First International Symposium, pp. 138-142.

Gunther, Oliver et al., "MMM: A Web-Based System for Sharing Statistical Computing Modules," IEEE, May-Jun. 1997, vol. 1, Issue 3, pp. 59-68.

U.S. Appl. No. 10/918,054, filed Aug. 12, 2004, Notice of Allowance, Sep. 20, 2012.

Zhang et al., Binary XML Storage Query Processing in Racle 11g, Dated Aug. 24-28, 2009 dated, Lyon, France, 12 pages.

Bremer et al., "Integrating Document and Data Retrieval Based on XML", dated Aug. 12, 2005, 31 pages.

Pal et al., "Indexing XML Data Stored in a Relational Database", Proceedings of the 30th VLDB Conference, Toronto, Canada, dated 2004, 12 pages.

U.S. Appl. No. 11/736,132, filed Apr. 17, 2007, Office Action, Sep. 9, 2013.

U.S. Appl. No. 12/961,394, filed Dec. 6, 2010, Final Office Action, Sep. 23, 2013.

U.S. Appl. No. 12/961,394, filed Dec. 6, 2010, Interview Summary, Nov. 6, 2013.

U.S. Appl. No. 12/961,394, filed Dec. 6, 2010, Advisory Action, Dec. 3, 2013.

* cited by examiner

INTELLIGENT FLOOD CONTROL MANAGEMENT

FIELD OF THE INVENTION

The present invention relates to improving performance of computer systems, and in particular, to dynamically monitoring and managing resource usages of processes in computer systems.

BACKGROUND OF THE INVENTION

In a multi-node system, nodes may appear as a single system to application servers and user applications. Each node may handle its share of the workload during the normal operation when all the nodes in the multi-node system supposed to be up are in fact up. When one of the nodes fails (or is out of service for whatever reason), a particular node may be required to take over some, or all, of the failed node's share of the workload.

Unfortunately, the takeover (or failover) node may have used its capacity for its own share of the workload to such an extent that the node can hardly take over the failed node's share of the workload. For example, the takeover node may already use 60% of CPU time for processing its own share of the workload. Servicing the failed node's share of the workload may require more than 40% of additional CPU time. Thus, when the failed node's share of the workload is over flown to the takeover node, the takeover node does not have sufficient CPU time for processing both its own share and the failed node's share of the workload. This may cause the takeover node to fail.

This situation may be worsened, because the application servers and user applications that initiate the workload may not be aware of the fact that one or more nodes of the multi-node system are out of service. In fact, it may appear to the application servers and user applications that the multi-node system is handling an ever smaller number of transactions than before. The application servers and user applications may increase the number of requests sent to the multi-node system. As a result, more nodes in the multi-node system may fail.

As clearly shown, techniques are needed for dynamically monitoring and managing resource usages of processes in computer systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
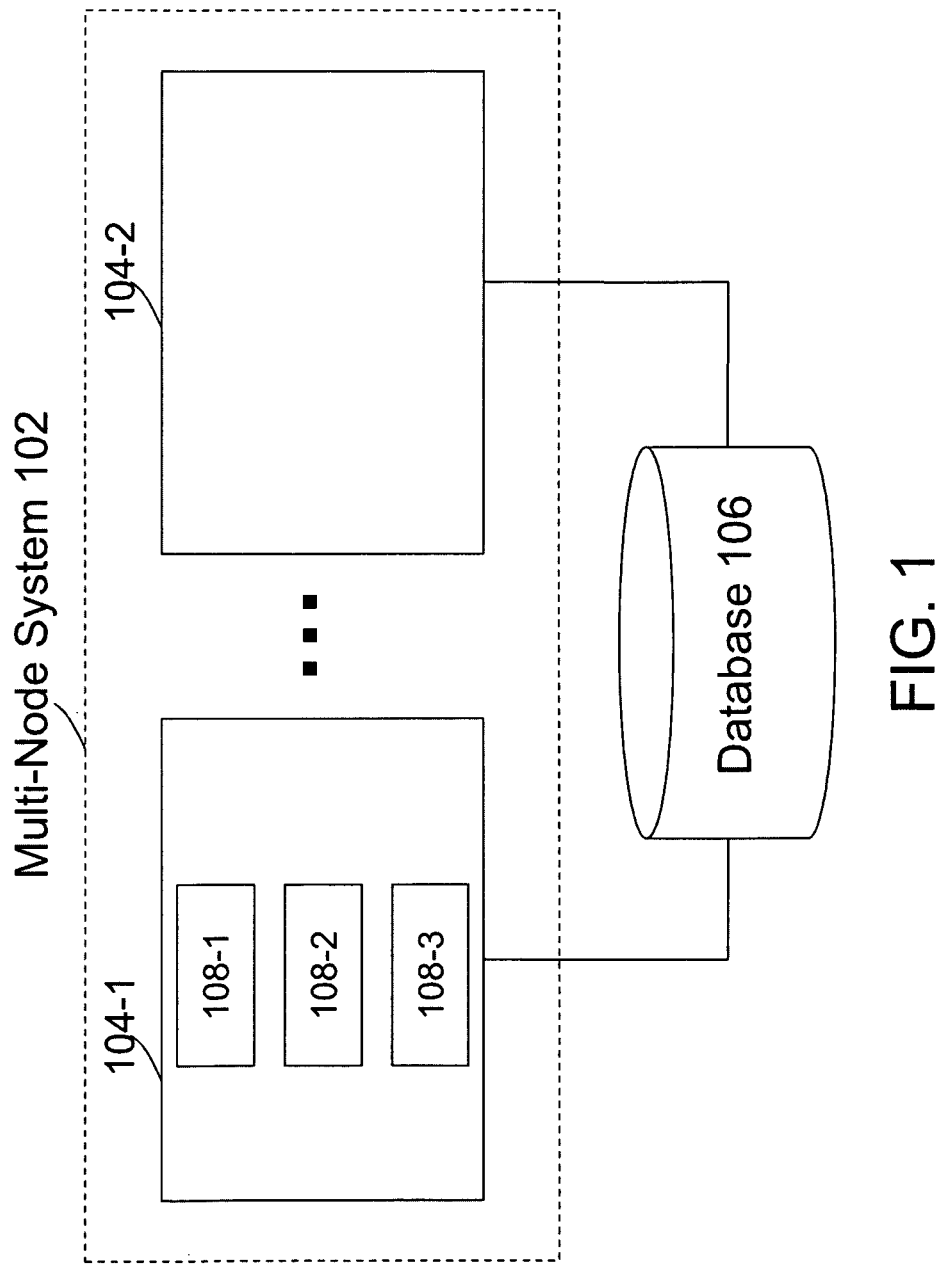
FIG. 1 illustrates an example system that comprises an example multi-node system according to an embodiment of the present invention.

Techniques for dynamically monitoring and managing resource usages of processes in a computer system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for dynamically monitoring and managing resource usages of processes on a node of a multi-node system. In an embodiment, a resource control mechanism monitors resource usages on the node, using a variety of process information generated on the node. Based on a plurality of corresponding thresholds for the resource usages, the resource control mechanism determines whether one or more resource usages are high (for example, exceeding corresponding thresholds for the one or more resource usages). If that is the case, the resource control mechanism implements a number of resource usage reduction policies to promptly reduce the resources usages that are high. These resource usage reduction policies may include, but are not limited to, rejecting or throttling requests for new database connections to be established on the node in the multi-node system, prioritizing processes based on whether execution of a process will likely result in a reduction of resource usages on the node. Under these resource usage reduction policies, if a process likely generates new resource usage requirements, that process will be assigned a relatively low priority. Conversely, if a process likely releases resources, that process will be assigned a relatively high priority.

Other resource usage reduction policies such as batching up a plurality of messages in a single physical message may also be implemented when the node has high resource usages.

Example Database System

A database comprises database data and metadata that is stored on a persistent memory mechanism, such as a set of hard disks. Database data may be stored in one or more data containers represented on the persistent memory mechanism. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database management system ("DBMS") manages a database. A database management system may comprise one or more database servers. A multi-node system mentioned above may be used to implement the database management system. Each node in the multi-node system may host a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

User applications as database clients interact with a database server by submitting to the database server commands that cause the database server to perform operations on data stored in a database. A database command may be in the form of a database statement that conforms to a database language. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex data types.

Example Multi-Node System

According to an embodiment of the present invention, the techniques may be performed by a multi-node system 102 as illustrated in FIG. 1, which comprises multiple interconnected nodes (e.g., 104-1 and 104-2). The system 102 may provide user applications access to a database 106. These user applications may run on application servers that are operatively linked to the multi-node system 102. The nodes (104) in the multi-node system 102 may be in the form of computers (e.g. work stations, personal computers) interconnected via a network. Alternatively, the nodes (104) may be nodes of a grid, where each node is interconnected on a rack. The grid may host multiple multi-node systems. Each node 104 may be a separate physical computer, or a separate domain (which, for example, may run inside a virtual machine) among a plurality of domains that partition a physical computer. In embodiments where some of the nodes 104 may be domains, each domain behaves independently like a separate physical computer and constitutes a separate logical computer.

Each node 104 provides a plurality of resources to processes running on the node. As used herein, a resource may be a physical resource such as CPU time, main memory space, network I/O bandwidth, disk I/O usage, cache size, etc. A resource may also be a logical resource such as latches, semaphores, shared memory, or special data structures, etc.

For the purpose of illustration only, the node 104-1 comprises three resources (108-1 through 108-3). For example, the resource 108-1 may be CPU time, the resource 108-2 may be RAM space, and the resource 108-3 may be latches for shared data blocks of the database 106.

In some embodiments, node 104-1 is a database instance on which a number of database processes and non-database processes run. These processes may have different life spans and run for different time periods. Each of these processes may evolve in different stages that use different combinations of resources and different amounts of the resources. For example, a process that communicates messages between nodes may use CPU time and RAM space, but may not use latches for shared data blocks of the database 106, while another process that performs database checkpoint operations may use CPU time, RAM space, and, at some points of time, latches. In some embodiments, a resource control mechanism (e.g., 208 of FIG. 2) may be implemented on the node 104-1 to determine whether, when, and how much a process should be allowed to use various amounts of various resources 108 on the node 104-1 during a lifecycle of the process. An amount of a resource allocated to the process by the resource control mechanism 208 may be configured and changed programmatically or manually when the process starts up or while the process is running.

As used herein, the term "a process uses or incurs a resource" means that a certain amount of the resource is incurred (or used) by the process to the exclusion of other processes, regardless of whether the process is actively using any, or all, of that amount of the resource or not. The term "a process frees a resource" means that a certain amount of the resource previously incurred (or used) by the process has been made available on the node from a particular point of time (e.g., when the operating system or the database system carries out a free resource function call).

In some instances, a resource is automatically incurred by a process. For example, CPU time may be automatically incurred when a process is scheduled into an executing state on the node. An initial amount of memory space may also be automatically incurred by a process for storing program code and data when the process starts up on the node. Likewise, a resource may be automatically freed by a process, for example, when the process terminates on the node.

In contrast, a resource may also be incurred by a process if the process makes a request for the resource and if the request for the resource is granted by the resource control mechanism. For example, when a process needs additional heap memory in the middle of running, the process may use a memory allocation call such as "malloc( )" to make a request for a certain amount of additional memory. When the request is granted by the resource control mechanism, a certain additional amount of memory is incurred by the process from that point on until the process releases some, or all, of that amount of memory.

In some instances, a request for a resource needs not to be explicit. For example, when a process wishes to exclusively access a shared data block of the database 106 by making a call "retreiveDataBlockforReadWrite( )", a request for a latch for exclusive write access to the shared data block may be implicitly made, even though the call is only explicitly requesting the shared data block. When the call returns successfully, the latch for exclusive write access implicitly requested is granted by the resource control mechanism.

In some embodiments, a certain amount of a resource, as required by the process during its lifecycle, may be incurred by a process at once. In some other embodiments, a certain amount of a resource may be gradually or incrementally incurred by a process. Similarly, in some embodiments, a certain amount of a resource may be freed by a process at once. In some other embodiments, a certain amount of a resource may be gradually or incrementally freed by a process. It should be noted that incurring a certain amount of a resource by a process may or may not be symmetric or correlated with freeing the same amount of the resource by the process.

Example Resource Control Mechanism

Figure 2:
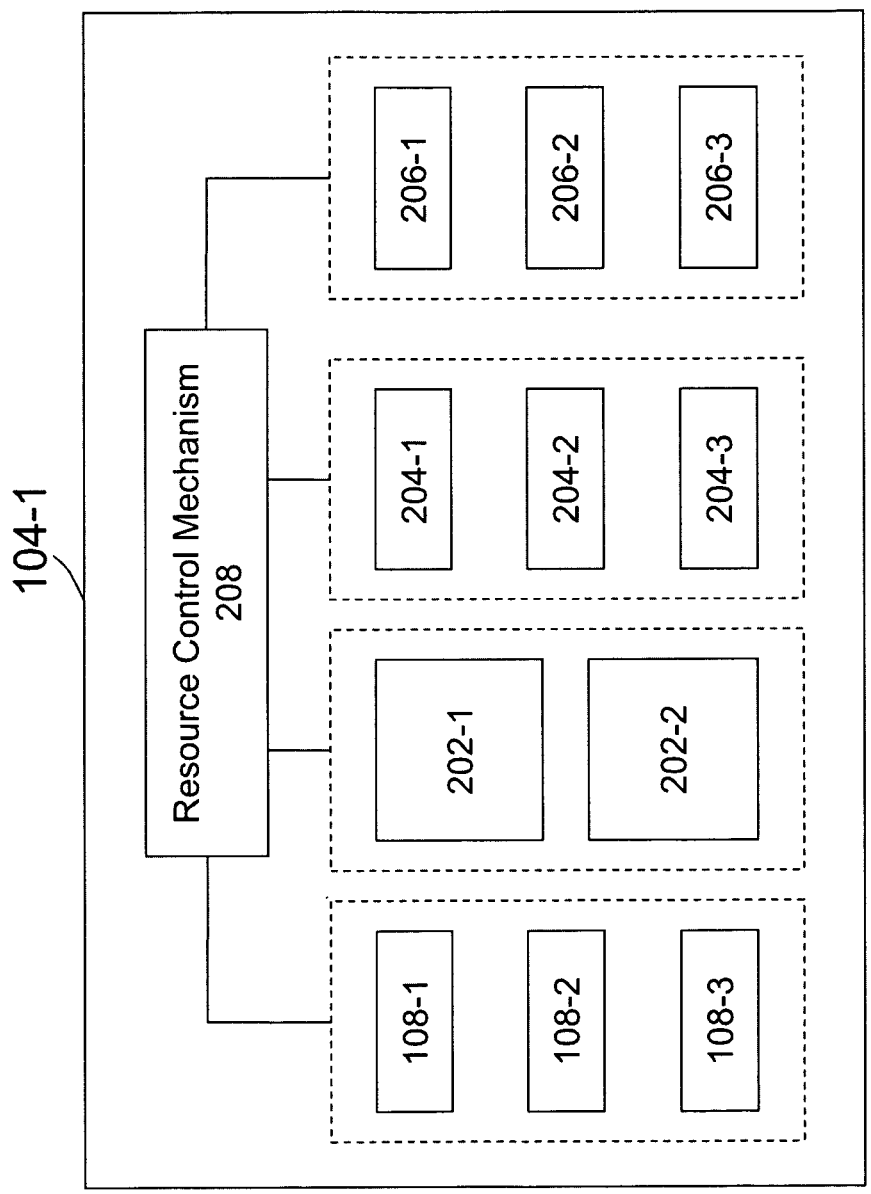
FIG. 2 illustrates an example node that comprises an example resource control mechanism according to an embodiment of the present invention.

FIG. 2 illustrates an example embodiment in which the resource control mechanism 208, in conjunction with the operating system (e.g., UNIX) and/or the database system software deployed on the node 104-1, monitors and controls resource usages (e.g., 204-1 through 204-3 for resources 108-1 through 108-3 as illustrated in FIG. 1 and FIG. 2) by processes running on the node 104.

As used herein, the term "resource usage" refers to an aggregated number, an aggregated amount, an aggregated percentage, or otherwise an aggregated measure that indicates how much of a resource has been incurred by all processes running on the node 104-1. Upon determining a resource usage for a resource, the resource control mechanism may use other information at its disposal (for example, system configuration information) to further determine how much of the resource remains available. For example, a resource usage for CPU time at a particular time may be determined as 40%, which indicates that 40% of CPU time as provided by one or more processors on the node 104-1 has been incurred by the processes on the node 104-1 at the particular time. The resource control mechanism determines therefore that 60% of CPU time remains available to serve new request for the resource.

Example Normal Mode

The resource control mechanism 208 may operate in two different modes depending on current resource usages on the node 104. In the first operational mode (or simply normal mode), the resource control mechanism 208 monitors a group of resources 108 as shown in FIG. 2 and determines whether any resource usage has exceeded a resource usage threshold 206. As illustrated in FIG. 2, each resource (e.g., 108-1 through 108-3) may have a resource usage threshold (i.e., 206-1 through 206-3, respectively). As used herein, the term "threshold" or "resource usage threshold" refers to a number, an amount, a percentage, or otherwise a quantity that indicates a critical point separating a normal region of resource usage for a resource from a high-usage region of resource usage for the resource. For example, a threshold may be 40% for resource usage of CPU time. A resource usage for CPU time that exceeds 40% is in a high-usage region of resource usage for CPU time, while another resource usage for CPU time that is below 40% is in a normal region of resource usage for CPU time.

Threshold for a resource 108 may be pre-configured and/or reconfigured manually or programmatically. In some embodiments, other configuration data on the node 104-1 may be used to determine thresholds for various resources on the node 104-1. For example, if the node 104-1 is responsible for taking over entire work from another node 104 in the multi-node system 102, thresholds for resource usages may be set at various values around 40%, allowing some room for any unexpected usages on the node 104-1. Thus, when the other node fails, the node 104-1 is still able to take over all the work without causing itself out-of-service. In alternative configurations, the node 104-1 may not be assigned any responsibility for taking over another failed node, or may be assigned with only a portion of work of another failed node. Thresholds for various resources may be set accordingly based on these and other factors.

In some embodiments, in the normal mode, the resource control mechanism 208 allows resources to be incurred so long as the resources are still in the normal regions. In some embodiments, a total usable amount of a resource is not fixed (unlike CPU time, for example, whose total usable amount is 100%). In these embodiments, the resource control mechanism 208 may increase or decrease the total usable amount depending on actual resource usage of the resource. For example, a buffer cache on a node 104 that caches previously retrieved data blocks may be increased or decreased to certain extents by the resource control mechanism 208 depending on actual resource usages of the buffer cache. In some embodiments, for a resource of which the resource control mechanism 208 can increase and decrease a total usable amount, a determination that resource usage of a resource is in a high-usage region occurs after the resource control mechanism 208 has increased the total usable amount of the resource to a maximum.

In some embodiments, node-wise resource usage information (shown as 202-1 of FIG. 2) such as stats, trace, and log files are will be, or alternatively and/or additionally, has already been, generated on the node 104-1. This node-wise resource usage information 202-1 may indicate how much memory or how many semaphores a process has used or has been using, how much heap memory the process has incurred or has been incurring, how many messages at what sizes the process has sent or has been sending to other processes on the node 104-1 or other nodes 104, etc. In some embodiments where the node 104-1 is a database node in a multi-node system 102 as illustrated in FIG. 1, database-specific resource usage information (shown as 202-2 of FIG. 2) will be, or alternatively and/or additionally, has already been, generated on the node 104-1. This database-specific resource usage information 202-2 may indicate how many transactions a database process has processed or has been processing, how much buffer cache the database process has consumed or has been consuming, what latches for shared data blocks the database process has secured or is waiting to secure, etc. In some embodiments, the resource control mechanism comprises resource usage determination logic to interact with the operating system and/or database system (through function calls, for example) to gather resource usage information at a given runtime.

As illustrated in FIG. 2, the resource control mechanism may use the resource usage information (202) and the resource usage determination logic to determine/establish resource usages (e.g., 204-1 through 204-3) for resources (i.e., 108-1 through 108-3, respectively) on the node 104-1 at a given time. Based on the resource usages 204, the resource control mechanism determines whether one or more of the resources cross one or more corresponding thresholds 206 from normal regions to high-usage regions.

Example Safe Mode

When one or more of the resources that are monitored by the resource control mechanism 208 cross corresponding thresholds 206 from normal regions to high-usage regions, the resource control mechanism 208 may transition from the normal mode to a second operational mode (or simply safe mode) to distribute resources on the node 104-1 intelligently, to protect the node 104-1 from further deterioration in terms of resource usages and, and to reduce high resource usages on the node 104-1 so that all resource usages on the node 104-1 return to normal regions. In the safe mode, the resource control mechanism 208 implements one or more resource usage reduction policies to help restore the node 104-1 into the normal mode (in which all the resource usages will be in normal regions). In addition, the resource control mechanism 208 continues to monitor resource usages of the resources to determine whether the usages have indeed been restored into the normal regions. If so, the resource control mechanism 208 resumes operating in the normal mode.

Denying Requests for New Database Connections

In some embodiments, in the database system implemented by the multi-node system 102, when a user application on an application server (which may be remotely located from the multi-node system 102) needs to perform one or more database operations, the user application first requests a connection (or to be attached) with a session process on a node (e.g., 104-1) of the multi-node system. This session process may be one of many such processes in a session process pool. Once connected/attached to the session process (i.e., a new session is started), the user application may issue database commands (e.g., SQL statements) to the session process. The session process in turn secures necessary resources on the node 104-1 to carry out corresponding database operations as instructed by the database commands from the user application. In some embodiments, to carry out these database operations, not only direct resources that are necessary to carry out the operations are needed, but also secondary operations (e.g., logging), hence additional resources, may be incurred.

In some embodiments, when the user application finishes and disconnects (or is detached; hence the existing session is ended) from the session process, any resources still held by the session process for serving the user application are freed.

Thus, during a finite period between the attachment and the detachment of the user application, the session process incurs a number of resources. These resources are incurred if and when a session process is allowed to be connected with a user application to process the latter's database commands.

In some embodiments, in the safe mode, the resource control mechanism 208 is operable to deny (or cause to deny) requests for new database connections. Thus, resources that could be incurred by new user applications can be avoided. Instead, resources may be used for existing connections that have been previously allowed. As a result, session processes that serve the existing connections can complete their respective operations and to free the incurred resources at the completion of the operations, relatively promptly, thereby helping the node 104-1 return to the normal mode.

In some embodiments, in the safe mode, instead of denying all requests for new database connections as previously described, the resource control mechanism 208 is operable to allow (or cause to allow) only a small number of requests (say five per minute instead of a higher number per minute) for new database connections.

Prioritizing Processes

In some embodiments, in the safe mode, processes with higher priority levels may be allowed to continue their operations as usual. In some embodiments, in the safe mode, the resource control mechanism 208 is operable to prioritize requests for resources that may or may not be in high-usage regions. As used herein, the term "prioritize" means assigning values to a priority level attribute that is used by the node to determine whether, when, and what resources should be granted to a process. An example of a priority level attribute may be an operating system priority. Generally speaking, the higher a process's priority level, the more likely the process is to be granted access to resources. Particularly, a process that is of a higher priority level may be allowed to proceed before a lower priority level. A process that uses no or little resources whose usages are in high-usage regions may be allowed to proceed before other processes with the same priority level. A process that is holding a resource for which many other processes are waiting may be re-assigned with a high priority level so that the resource can be quickly released to avoid deadlock situations. Conversely, a process that is holding resources for which no other, or very few, processes are waiting may be downgraded to a low priority level, or alternatively maintain its relatively low priority level.

For example, requests for new database connections may be given a relatively low priority level so that processes associated with the requests are allowed at a relatively slow rate on the node 104-1, as compared with that in the normal mode.

On the other hand, a process that has secured some, or all, of the needed resources may be given a higher priority level by the resource control mechanism 208 so that the process may finish its operation and release the resources the process has incurred. This process may have already held latches or other resources that are being waited by other processes before the operational mode transitions from the normal mode to the safe mode. When the process that has secured a relatively large amount of resources is given a high priority level to finish its work in the safe mode, likelihood of deadlocks on the resources may be avoided or significantly reduced.

A process that serves a critical or important function on the node 104-1 may be given high priority levels and allowed to proceed before other processes. For example, a background process (e.g., a process that determines which process obtains what type of latches for which shared data block of the database 106) on which many foreground processes (e.g., a session process to which a user application sends database commands) depend may be given a priority level so that the important background process is able to incur needed resources more readily than the foreground processes. Priority levels of these processes may be manually or programmatically provided on the node 104-1. Priority levels of these processes may also be determined based in part on runtime information.

In some embodiments, database-specific resource usage information 202-2 may identify which process currently holds a resource such as a latch and which other processes currently wait for the held resource. Based on this runtime information, the resource control mechanism 208 may prioritize the processes such that the process currently holding the resource is allowed to proceed with a higher priority level than those of the waiting processes.

Terminating Processes

In some embodiments, in the safe mode, the resource control mechanism 208 may determine that out of all processes that are running on the node 104-1, some processes are non-critical. Examples of non-critical processes include, but are not limited to garbage collection processes, informational event generation processes, etc. In some embodiments, these non-critical processes may be terminated in order to free up resources currently incurred by the processes.

In some situations, even if a process is not non-critical, nevertheless the process may be terminated. For example, session processes that have started but are still in initial stages of waiting for or incurring resources may be terminated by the resource control mechanism 208 in order to free up resources currently incurred by the processes and to prevent further resources from being incurred. In some embodiments, termination of processes on the node 104-1 may cause errors to be returned to user applications. In some embodiments, the user application may be programmed to retry the same requests with the multi-node system 102. These retried requests may overflow to other nodes 104 in the multi-node system 102, instead of the node 104-1, which is presently operating in the safe mode. For example, software middleware (for example, clusterware) may be deployed in the multi-node system 102 to dispatch requests among the nodes 104 in the system 102. When received by the multi-node system 102, a retried request may be redirected by the clusterware to another node 104, other than node 104-1.

Reducing Input/Output Operations

In some embodiments, in the safe mode, the resource control mechanism 208 may be operable to reduce, or cause to reduce, the number of physical messages that are sent between processes on the same node (i.e., 104-1) or different nodes 104. For example, instead of immediately sending a message in a function call issued by a process on the node 104-1, which would cause a separate I/O operation for each such message, the resource control mechanism may place the message in a message buffer. When the message buffer exceeds a certain size or (alternatively and/or optionally) when a certain time period has elapsed, messages in the message buffer may be sent in a single physical message that may only involve minimum I/O operations.

In some embodiments, in the safe mode, the resource control mechanism 208 may be operable to reduce, or cause to reduce, the number of checkpoints. When a checkpoint is issued, dirty blocks in the buffer cache are written to datafiles (which may comprise a number of data blocks) of the database 106 and the latest commit data is also updated in the datafiles of the database 106. Since a checkpoint may cause a number of I/O operations and need large amounts of resources to process, the reduction of checkpoints in the safe mode alleviate resource usages of the respective resources that are needed to process the checkpoint.

In the safe mode, the resource control mechanism 208 continues to monitor the group of resources 108 as shown in FIG. 2 and determines whether each of the resource monitored is operating in a normal region. If so, the resource control mechanism 208 may transition the node 104-1 from the safe mode to the normal mode.

Example Process

Figure 3:
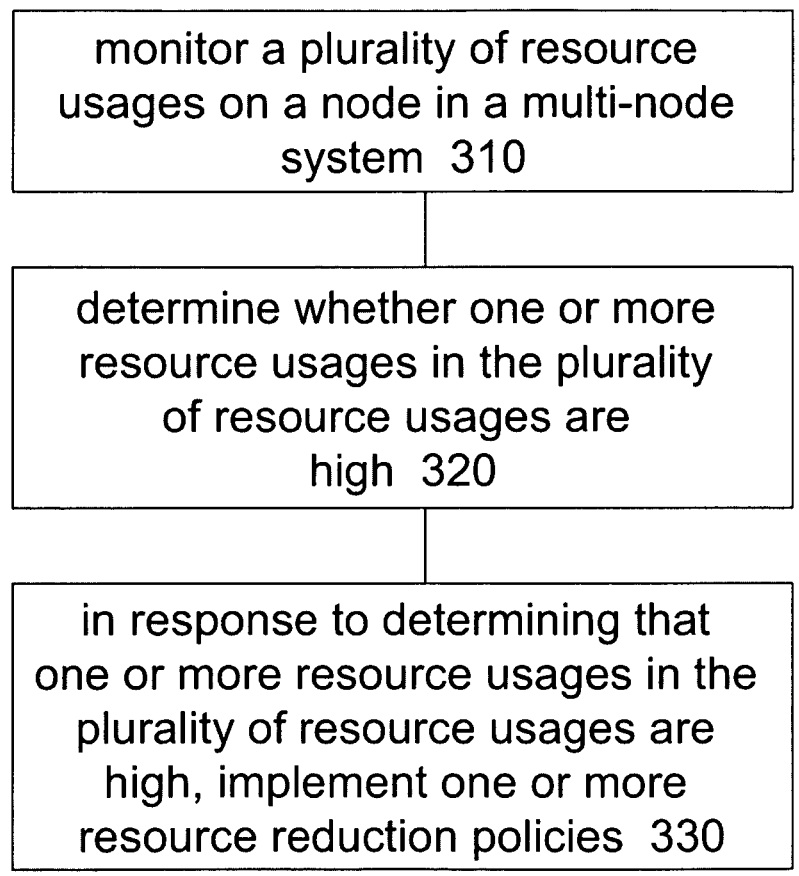
FIG. 3 is an example processing flow for dynamically monitoring and managing resource usages of processes on an example node according to an embodiment of the present invention.

FIG. 3 illustrates an example process under the new techniques. In block 310, a resource control mechanism (e.g., 208 of FIG. 2) monitors a plurality of resource usages 108 on a node (e.g., 104-1) in a multi-node system (e.g., 102). The plurality of resource usages that are monitored by the resource control mechanism 208 may include a resource usage 204 for a resource 108, on the node 104-1, such as the aforementioned CPU time, memory, network bandwidth, database transaction processing capacity, etc. In some embodiments, to monitor the plurality of resource usages 204 on the node 104-1 in the multi-node system 102, the resource control mechanism includes analyzing resource usage data (e.g., 202-1 and 202-2 of FIG. 2) generated on the node 104-1. The resource usage data may include resource usage data (e.g., 202-1) generated by the operating system deployed on the node 104-1, or database-specific resource usage data (e.g., 202-2) generated by database system software deployed on the node 104-1.

In block 320, the resource control mechanism 208 determines whether one or more resource usages (e.g., 204-1) in the plurality of resource usages (e.g., 204-1 through 204-3) are high (i.e., in high-usage regions). For example, initially, the resource control mechanism 208 may operate in a normal mode, as previously described, as all the monitored resource usages may be normal (i.e., in normal regions). Once any of the resource usages moves into a high-usage region, the resource control mechanism 208 may transition from the normal mode to a safe mode, as previously described. In the safe mode, the resource control mechanism 208 implements a plurality of resource usage reduction policies to help restore the node 104-1 into the normal mode. One resource usage reduction policy may be to reject requests for new database connections. In some embodiments, if a request for a new database connection were granted, the new database connection requested would be established between a user application that made the request and a session process in a session process pool on the node 104-1. In turn, various amounts of resources would be incurred by the user application and the session process to carry out further operations in connection with the user application. As described previously, various resource usage reduction policies may be implemented by the resource control mechanism 208 to speed up the transition from the safe mode to the normal mode on the node 104-1.

In block 330, in response to determining that one or more resource usages in the plurality of resource usages 204 are high, the resource control mechanism 208 transitions the operational mode from the normal mode to the safe mode, and implements one or more resource usage reduction policies for the purpose of restoring the node to the normal node. In some embodiments, some resource usage reduction policies may be implemented by the resource control mechanism 208 first. If the node 104-1 continues to experience high resource usages, more resource usage reduction policies may be implemented by the resource control mechanism 208.

In some embodiments, in the safe mode, the resource control mechanism 208 rejects at least one request for a new database connection. By rejecting such a request, the resource control mechanism 208 helps other existing database connections finish their work faster and hence release incurred resources faster than otherwise. In some embodiments, the rejected request may be re-routed by cluster-wide software (such as the above discussed clusterware) deployed in the multi-node system 102 or by the user application to a different node 104.

In some embodiments, the resource control mechanism 208 may continuously monitor and influence resource usages incurred by individual processes, a type of processes, a collection of processes, and/or a particular subsystem on the node 104-1.

Hardware Overview

Figure 4:
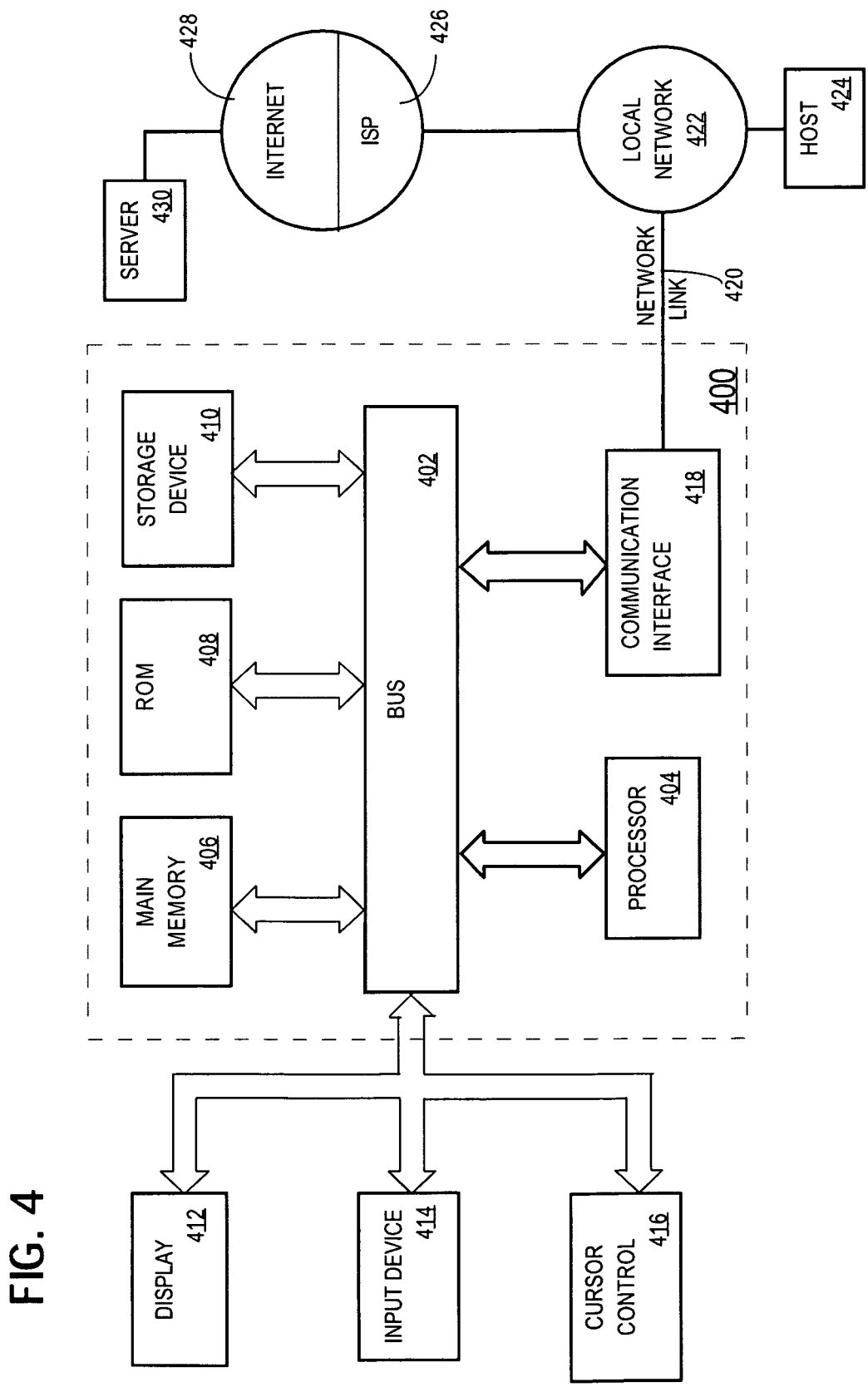
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
monitoring a plurality of resource usages on a node;
granting to a plurality of database processes, by a resource control mechanism of the node, one or more locks, each lock of said one or more locks granting access to one or more specified shared data blocks of a database;
determining whether a resource usage in the plurality of resource usages exceeds a resource usage threshold; and
when the resource usage in the plurality of resource usages exceeds the resource usage threshold, implementing one or more resource usage reduction policies, by the resource control mechanism, to restrict access to one or more particular shared data blocks of the database by delaying or denying one or more requested locks corresponding to the one or more particular shared data blocks;
wherein the method is performed by one or more computing devices.

2. The computer-implemented method of claim 1, wherein the plurality of resource usages includes a resource usage selected from network bandwidth usage, memory usage and CPU usage.

3. The computer-implemented method of claim 1, wherein implementing the one or more resource usage reduction policies comprises prioritizing specific processes of the plurality of database processes based on one or more secured locks already granted to the specific processes by the resource control mechanism.

4. The computer-implemented method of claim 1, wherein implementing the one or more resource usage reduction policies comprises reducing input operations and output operations between the plurality of database processes by storing a plurality of messages in at least one buffer and sending messages stored in a selected buffer of the at least one buffer in a single physical message.

5. The computer-implemented method recited in claim 1, wherein the one or more locks comprise one or more exclusive write latches.

6. The computer-implemented method of claim 1, wherein implementing the one or more resource usage reduction policies comprises rejecting requests for new database connections to the database.

7. The computer-implemented method of claim 1, wherein implementing the one or more resource usage reduction policies comprises prioritizing specific processes of the plurality of database processes based on whether latches granted to the specific processes are for data blocks in high usage regions.

8. The computer-implemented method of claim 1, wherein implementing the one or more resource usage reduction policies comprises terminating a specific process requesting a latch from the resource control mechanism.

9. The computer-implemented method of claim 1, wherein the plurality of resource usages comprises at least one database-specific resource usage, wherein monitoring the at least one database-specific resource usage comprises analyzing database-specific resource usage data generated by database system software deployed on the node.

10. The computer-implemented method of claim 1, wherein the plurality of resource usages comprises at least one database-specific resource usage, wherein when the resource usage in the plurality of resource usages exceeds the resource usage threshold, the node transitions from a first operating state to a second operating state;

wherein the one or more resource usage reduction policies implemented by the resource control mechanism to restrict access to the one or more particular shared data blocks of the database are implemented in the second operating state.

11. A non-transitory computer-readable storage medium storing one or more sequences of instructions which, when executed by one or more processors, causes the one or more processors to perform:

monitoring a plurality of resource usages on a node;

granting to a plurality of database processes, by a resource control mechanism of the node, one or more locks, each lock of said one or more locks granting access to one or more specified shared data blocks of a database;

determining whether a resource usage in the plurality of resource usages exceeds a resource usage threshold; and when the resource usage in the plurality of resource usages exceeds the resource usage threshold, implementing one or more resource usage reduction policies, by the resource control mechanism, to restrict access to one or more particular shared data blocks of the database by delaying or denying one or more requested locks corresponding to the one or more particular shared data blocks.

12. The non-transitory computer-readable storage medium of claim 11, wherein the plurality of resource usages includes a resource usage selected from network bandwidth usage, memory usage and CPU usage.

13. The non-transitory computer-readable storage medium of claim 11, wherein implementing the one or more resource usage reduction policies comprises prioritizing specific processes of the plurality of database processes based on one or more secured locks already granted to the specific processes by the resource control mechanism.

14. The non-transitory computer-readable storage medium of claim 11, wherein implementing the one or more resource usage reduction policies comprises reducing input operations and output operations between the plurality of database processes by storing a plurality of messages in at least one buffer and sending messages stored in a selected buffer of the at least one buffer in a single physical message.

15. The non-transitory computer-readable storage medium recited in claim 11, wherein the one or more locks comprise one or more exclusive write latches.

16. The non-transitory computer-readable storage medium of claim 11, wherein implementing the one or more resource usage reduction policies comprises rejecting requests for new database connections to the database.

17. The non-transitory computer-readable storage medium of claim 11, wherein implementing the one or more resource usage reduction policies comprises prioritizing specific processes of the plurality of database processes based on whether latches granted to the specific processes are for data blocks in high usage regions.

18. The non-transitory computer-readable storage medium of claim 11, wherein implementing the one or more resource usage reduction policies comprises terminating a specific process requesting a latch from the resource control mechanism.

19. The non-transitory computer-readable storage medium of claim 11, wherein the plurality of resource usages comprises at least one database-specific resource usage, wherein monitoring the at least one database-specific resource usage comprises analyzing database-specific resource usage data generated by database system software deployed on the node.

20. The non-transitory computer-readable storage medium of claim 11, wherein the plurality of resource usages comprises at least one database-specific resource usage, wherein the one or more sequences of instructions include instructions which, when executed by the one or more processors, causes the one or more processors to perform: when the resource usage in the plurality of resource usages exceeds the resource usage threshold, transitioning the node from a first operating state to a second operating state;

wherein the one or more resource usage reduction policies implemented by the resource control mechanism to restrict access to the one or more particular shared data blocks of the database are implemented in the second operating state.

\* \* \* \* \*

UNITED STATES PATENT AND TRADEMARK OFFICE
CERTIFICATE OF CORRECTION

| | | |
|---|---|---|
| PATENT NO. | : 9,128,895 B2 | Page 1 of 1 |
| APPLICATION NO. | : 12/389306 | |
| DATED | : September 8, 2015 | |
| INVENTOR(S) | : Chan et al. | |

It is certified that error appears in the above-identified patent and that said Letters Patent is hereby corrected as shown below:

On the title page 3, item [56], column 2, line 22, delete "Racle" and insert -- Oracle --, therefor.

Signed and Sealed this
Seventh Day of June, 2016

Michelle K. Lee
*Director of the United States Patent and Trademark Office*